(12) United States Patent
Abert et al.

(10) Patent No.: US 6,848,563 B2
(45) Date of Patent: Feb. 1, 2005

(54) U-SHAPED ACCUMULATOR DEVICE WITH ENDLESS BELTS

(75) Inventors: Bernard Abert, Reze (FR); Philippe Carabin, Saint Sebastien sur Loire (FR)

(73) Assignee: Sogem FL, Z.A.C. du Haut Paimboeuf, Paimboeuf (FR)

( * ) Notice: Subject to any disclaimer, the term of this patent is extended or adjusted under 35 U.S.C. 154(b) by 0 days.

(21) Appl. No.: 10/240,934

(22) PCT Filed: Apr. 5, 2001

(86) PCT No.: PCT/FR01/01042

§ 371 (c)(1),
(2), (4) Date: May 4, 2003

(87) PCT Pub. No.: WO01/76989

PCT Pub. Date: Oct. 18, 2001

(65) Prior Publication Data

US 2003/0155212 A1 Aug. 21, 2003

(30) Foreign Application Priority Data

Apr. 7, 2000 (FR) .......................................... 00 04595

(51) Int. Cl.[7] .............................................. B65G 37/00
(52) U.S. Cl. ..................... 198/347.1; 198/812; 198/831
(58) Field of Search .......................... 198/347.1, 347.2, 198/831, 812, 594

(56) References Cited

U.S. PATENT DOCUMENTS

| | | | | |
|---|---|---|---|---|
| 3,838,767 A | * | 10/1974 | Taylor | 198/831 |
| 4,179,026 A | * | 12/1979 | de Vries | 198/831 |
| 4,549,647 A | * | 10/1985 | Cosse | 198/594 |
| 5,314,054 A | * | 5/1994 | van Laar | 198/347.1 |
| 6,591,963 B2 | * | 7/2003 | Wipf | 198/347.2 |
| 6,612,417 B2 | * | 9/2003 | Garvey | 198/831 |

FOREIGN PATENT DOCUMENTS

| | | | |
|---|---|---|---|
| FR | 2766803 | * | 2/1999 |

* cited by examiner

*Primary Examiner*—James R. Bidwell
(74) *Attorney, Agent, or Firm*—Young & Thompson

(57) ABSTRACT

An accumulator having a general U-shape includes two parallel endless belt conveyors, communicating through an endless belt conveyor with semicircular trajectory borne by a mobile carriage driven by a translation movement parallel to the parallel conveyors. The accumulator for guiding (20, 21, 22, 23) the upper side of the endless belt (5) of the first conveyor (4) adapted to lower the downstream part of the upper side located beneath the semicircular conveyor (10). The lowering places in the same plane, the transport plane of the first conveyor (5) and the transport plane of the semicircular conveyor (10). The guide is simultaneously mobile with the carriage (16) for manoeuvring in translation the semicircular conveyor (10) so that the downstream end of the transport plane of the first conveyor (5) should follow the displacement of the upstream end of the semicircular conveyor (10).

8 Claims, 5 Drawing Sheets

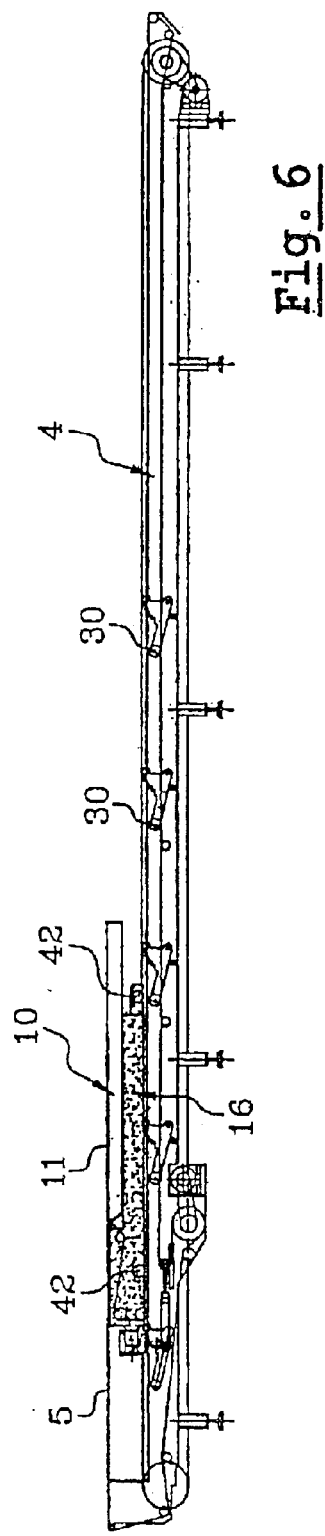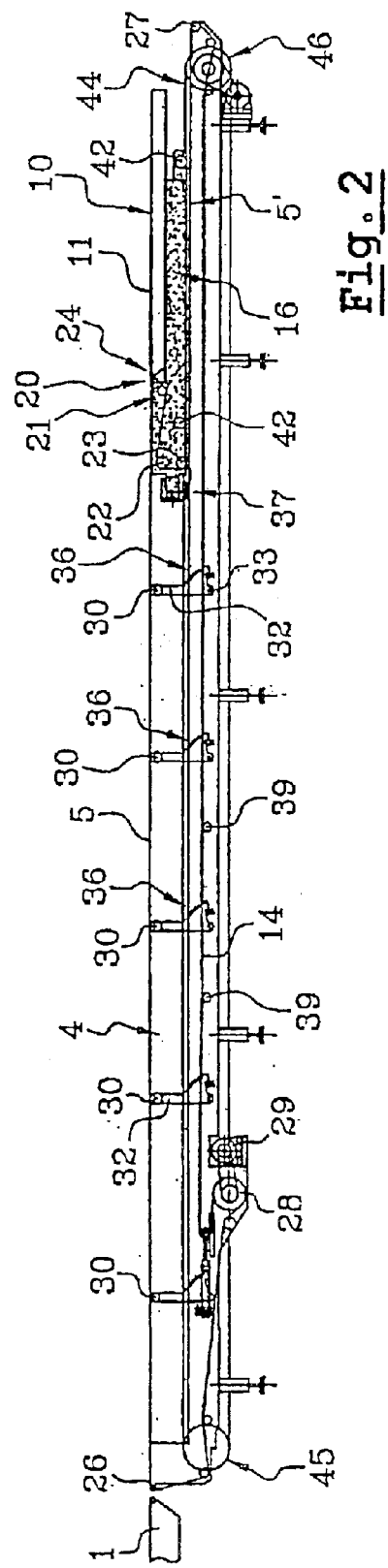

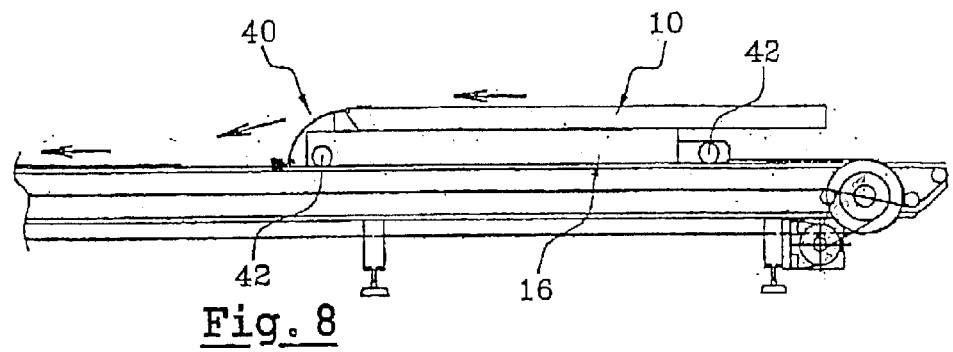
Fig. 8
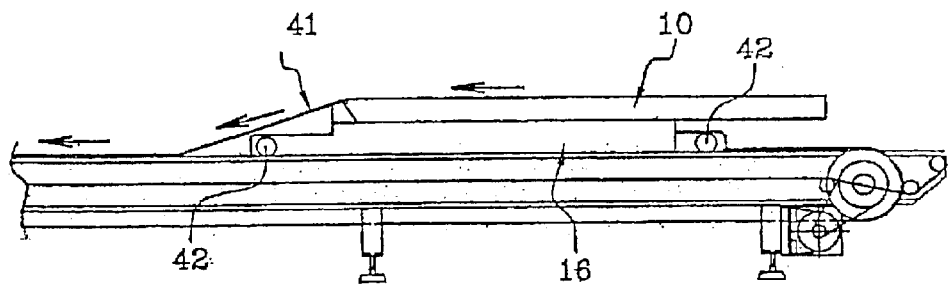
Fig. 9
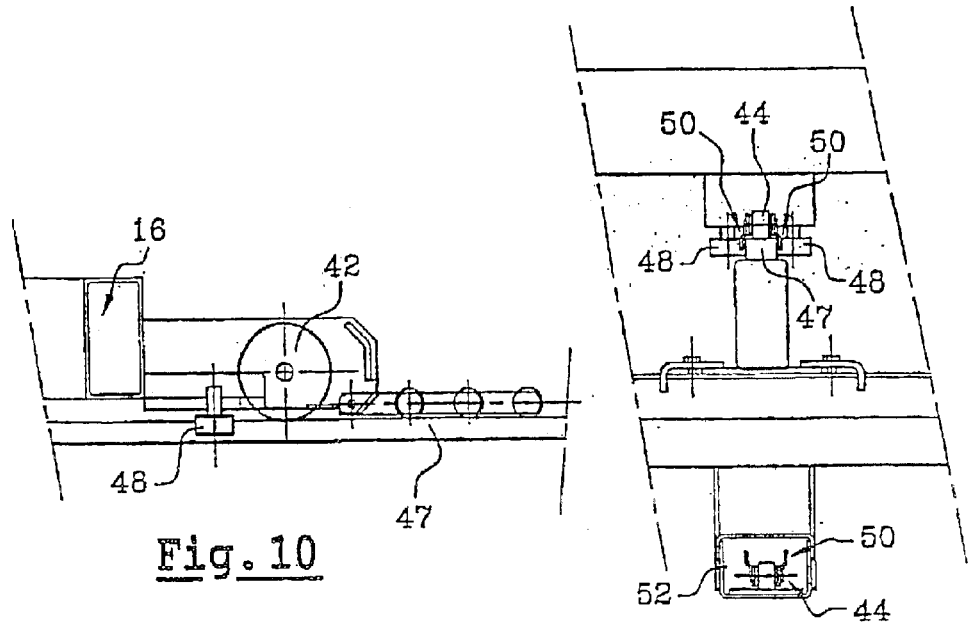
Fig. 10
Fig. 11

US 6,848,563 B2

U-SHAPED ACCUMULATOR DEVICE WITH ENDLESS BELTS

CROSS REFERENCE TO RELATED APPLICATION

This is the 35 USC 372 national stage of international application PCT/FR01/01042 filed Apr. 5, 2001, which designated the United States of America.

FIELD OF THE INVENTION

This invention concerns an "accumulator" device, enabling continuous regulation of the transfer of products between an upstream unit and a downstream unit.

BACKGROUND OF THE INVENTION

Within the framework of manufacture of biscuits, chocolate bars, mechanical parts or others . . . the various units of the production line are generally connected by transfer systems, often endless belt conveyors. In some cases, and notably when the downstream receiving unit calls for regular supply, particular transfer devices are used, capable of absorbing jerky throughputs of the upstream machine(s), and capable of storing at least temporarily the products when the downstream unit is not working correctly.

The document FR-A-2 524 436 describes such a transfer regulating device, composed of two endless belt linear conveyors, arranged parallel to one another and communicating via a connection system in the form of a circular plate or of semicircular conveyor, borne by a mobile carriage driven by a translation movement parallel to said parallel conveyors. The translation movement of the circular plate or of the semicircular conveyor above linear conveyors is controlled to increase or reduce the length of the transport plane of the products, in relation to the storage requirements or to the emptying possibilities.

As the transport plane of the connection system (circular plate or semicircular conveyor) is situated above the transport planes of the linear conveyors, the transfer of the products at the upstream and downstream ends of this connection system is performed via tilted ramps. However, these ramps may lead to erratic transport of the products; they may cause degradations, in particular within the framework of the treatment of fragile products.

SUMMARY OF THE INVENTION

This invention suggests a new structure of an accumulation facility enabling to remedy this shortcoming.

The accumulator device according to this invention is of the type composed of a first linear conveyor with fixed ends; with an endless belt, adapted to receive the products from an upstream unit, and of a second linear conveyor, also with fixed ends and with endless belt, arranged parallel to the first conveyor, adapted to deliver the products towards a downstream unit; these first and second conveyors are communicating via a conveyor with endless belt with semicircular trajectory which is provided above them and which is borne by a mobile carriage driven by a translation movement parallel to said first and second conveyors The transport plane of the products, with variable length according to the position of the semicircular conveyor, is composed of the upstream section of the upper side of the belt of the first conveyor, of the upper side of the belt of the semicircular conveyor and of the downstream section of the upper side of the belt of the second linear conveyor.

According to this invention, this accumulator device comprises means for guiding the upper side of the belt of the first conveyor, adapted to lower the downstream section of said upper side situated beneath the semicircular conveyor and which does not serve as a transport plane of the products, said lowering enabling to place in the same plane, the transport plane of said first conveyor and the transport plane of said semicircular conveyor, said guiding means being simultaneously mobile with the carriage for maneuvering in translation said semicircular conveyor so that the downstream end of the transport plane of said first conveyor should follow the displacement of the upstream end of said semicircular conveyor.

Still according to the invention, the means for guiding the upper side of the first conveyor are borne by the mobile carriage of the semicircular conveyor.

According to another characteristic, the section of the endless belt forming the transport plane of the first conveyor is associated with retractable supporting means maneuvered in relation to the translation displacement of the semicircular conveyor.

According to a preferred embodiment, these supporting means have the shape of retractable rolls, and according to a preferred arrangement, these retractable rolls are maneuvered by the mobile carriage of the semicircular conveyor.

In a particularly interesting embodiment, the supporting rolls of the belt are each mounted on a bracket fitted with at least one toothed sector which cooperates with a rack borne by the mobile carriage of the semicircular conveyor, to lower or raise each roll in relation to the displacement of said carriage.

According to another particularity, the translation maneuvering means of the mobile carriage of the semicircular conveyor are composed of a traction chain whereof both ends are interconnected with said carriage, and which winds around two pulleys whereof the one is motorised. This mobile carriage comprises means for guiding along a longitudinal rail, which rail also serves as a means for guiding the upper side of the traction chain via lateral guides provided on the links of said chain, or at least on some of them.

According to a preferred embodiment, similar belt guiding and supporting means are provided on the second linear conveyor, so that its transport plane is situated on the same plane as the transport plane of the semicircular conveyor.

In other possible embodiments, the upper side of the second linear conveyor of the facility can be provided beneath the semicircular conveyor, whereas a complementary device is then arranged in the extension of the downstream end of said semicircular conveyor to follow the transfer of the products on the underlining transport plane of the second linear conveyor.

BRIEF DESCRIPTION OF THE DRAWINGS

But the invention will be better illustrated, without being limited thereto, using the following description of various possible embodiments, given solely for exemplification purposes and represented on the appended drawings, wherein:

FIG. 2 is a longitudinal sectional diagrammatical view along 2—2 of the accumulation facility illustrated on FIG. 1;

FIG. 6 corresponds to the same sectional view as FIG. 2, but with a position different of the semicircular conveyor;

FIGS. 8 and 9 show possible embodiments of the second linear conveyor and of the transfer principle on said conveyor of the products from the semicircular conveyor;

FIG. 10 is a lateral view showing one of the ends of the mobile carriage of the semicircular conveyor with its guiding means and its traction chain;

FIG. 11 is a cross-sectional view showing the guiding means of the mobile carriage and the guiding system of its traction chain.

DETAILED DESCRIPTION OF THE INVENTION

Figure 1:
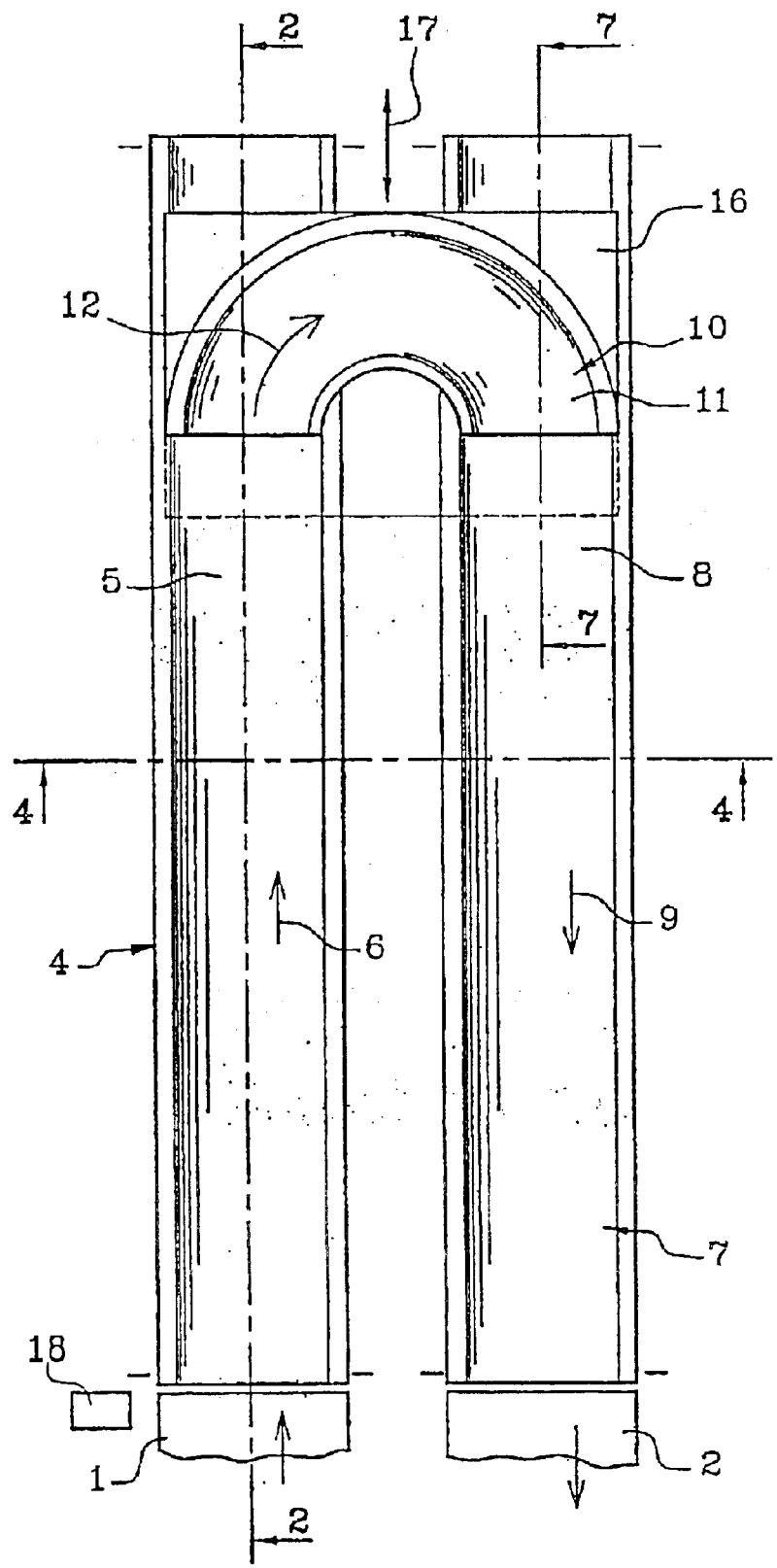
FIG. 1 is a top diagrammatical view of an accumulation facility according to this invention.

As represented on FIG. 1, the accumulator device is designed to be positioned between an upstream unit (for example a biscuit baking oven) which supplies the products via an inlet transport device 1, and a downstream unit (for example a packaging facility) supplied by an outlet transport device 2.

This accumulator device comprises:

a first linear conveyor 4 with endless belt 5 placed in the extension of the. inlet transport device 1 and whereof the upper side of the belt is driven along the direction of the orientation arrow 6, a second linear conveyor 7 with endless belt 8, arranged parallel to the first conveyor 4 in the extension of the outlet transport device 2 and whereof the upper side of the belt is driven along the direction of the orientation arrow 9, and a semicircular conveyor 10, also with endless belt 11 whereof the upper side is driven along the orientation arrow 12; this conveyor 10 forms a connection structure of both linear conveyors 4 and 7.

The linear conveyor 10 is a conventional semicircular conveyor; it is placed on both linear conveyors 4 and 7 so that the upper side of its endless belt 11 picks up the products transported by the first conveyor 4, to dump them onto the second conveyor 7.

Besides, this semicircular conveyor 10 is borne by a carriage 16 which is mobile in translation along the orientation arrow 17, parallel to the longitudinal axes of the linear conveyors 4 and 7 to enable to modify the length of transport of the products on the facility. It can be understood that in relation to the direction of displacement of the semicircular conveyor 10, the transport length of the products is increased or reduced between the inlet 1 and outlet 2 transport devices.

The operation of the facility is controlled based upon the speeds of the upstream and downstream units. Based upon the corresponding information which determines the accumulation requirements, the speeds of the endless belts 5, 8 and 11 of the conveyors 4, 7 and 10 are monitored, as well as the translation displacement of the mobile carriage 16.

Possibly, a cell 18 for detecting the products is placed at the inlet zone of the products onto the accumulator, i.e. the transfer zone of the inlet transport device 1 onto the first conveyor 4. Based upon the information provided by this cell 18, one can fine-tune the speed of at least one of the endless belts of the accumulator device and/or the displacement of the mobile carriage 16 to store the products or the rows of products with a regular pitch.

The loading of the accumulation facility is thus optimised and the products can be delivered at regular rate towards the downstream unit.

In order to limit the disturbances of the products during transport, the accumulation facility according to this invention comprises means which enable to place on the same plane, the transport plane of the first linear conveyor 4 and the transport plane of the semicircular conveyor 10.

Figure 3:
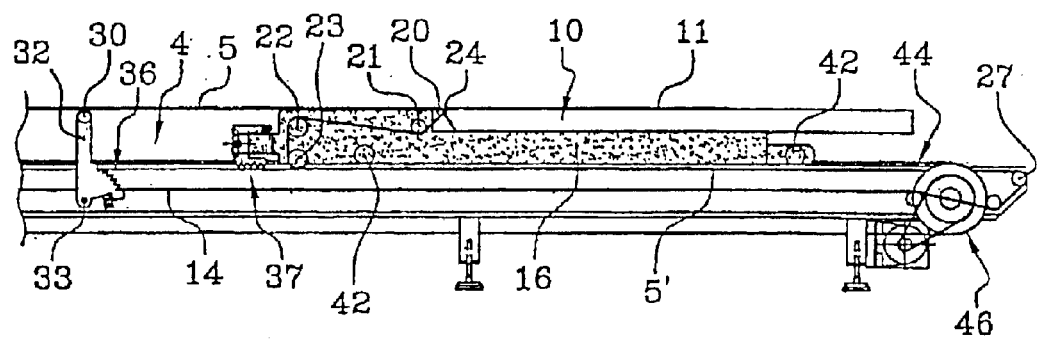
FIG. 3 is an enlarged view of the right-hand section of FIG. 2.

As can be seen on FIGS. 2 and 3, the endless belt 5 of the linear conveyor 4 is guided by rolls 20, 21, 22 and 23 interconnected with the mobile carriage 16 in order to lower its downstream section 5' situated beneath the semicircular conveyor 10 and which does not serve as a transport plane of the products. This deviation of the trajectory of the endless belt 5 enables to create a space wherein is accommodated the semicircular conveyor 10 so that the upper side of its endless belt 11 is placed in the same horizontal plane as the upper side of the endless belt 5 of the linear conveyor 4.

The first guiding roll 20 of the upper side of the endless belt 5 is placed opposite the roll 24 which guides the upstream end of the semicircular conveyor 10 in order to provide quasi continuity of the transport plane of the products. As guiding means 20, 21, 22 and 3 of the upper side of the endless belt 5 are interconnected with the mobile carriage 16, one may easily understand that during displacements of this mobile carriage 16, the downstream end of the transport plane of the linear conveyor 4, delineated by the mobile roll 20, follows the upstream end of the semicircular conveyor 10, delineated by the mobile carriage 24.

FIG. 2 shows that the upstream end of the conveyor 4 delineated by the fixed roll 26 is situated at higher level than its downstream end delineated by the fixed roll 27.

Still on the same Figure, one can also note the drum 28 which drives the endless belt 5 via a motorised system 29.

To ensure correct transport of the products, the section of the upper side of the endless belt 5 situated upstream of the guiding roll 20 is supported by retractable free bending rolls 30, spaced regularly, maneuvered by the mobile carriage 16.

As shown on FIGS. 2 to 5, these rolls 30 are each mounted on a toggle bracket 32 which has here the shape of lateral arms hinged around a pivoting axis 33. This axis 33 is parallel to the axis of the rolls 30.

Figure 5A:
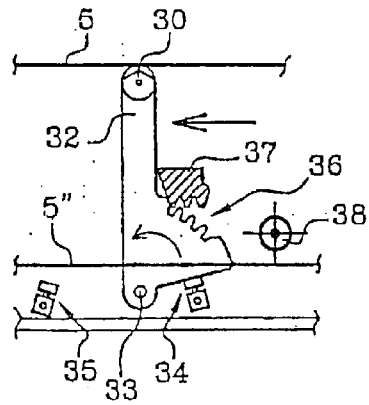
FIGS. 5a and 5b illustrate, diagrammatically, the maneuvering of the supporting rolls of the endless belts of the first and second linear conveyors.
Figure 5B:
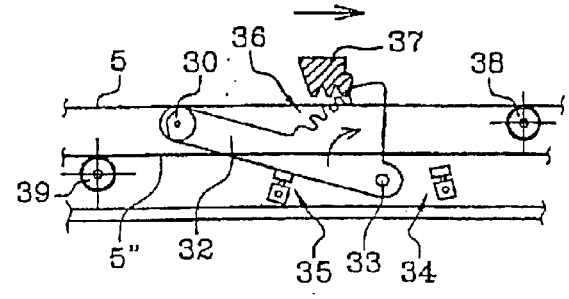

The clearance of the bracket 32 is delineated by two stops (FIGS. 5a and 5b), the one 34 fixing the upper position of the roll 30 (FIG. 5a) and the other 35 fixing its lower position (FIG. 5b).

One or both lateral arms 32 comprise a toothed sector 36 adapted to co-operate with a rack 37 arranged on the mobile carriage 16 to lower or raise the rolls 30 in relation to the displacement of the semicircular conveyor 10. When the mobile carriage 16 moves towards the upstream end of the linear conveyor 4 and arrives close to a belt-supporting roll 30, the rack 37 actuates the toothed sector 36 (FIG. 5a) to cause the bracket 32 to pivot and to lower the corresponding roll 30. The bracket 32 touches the stop 35 and in this lowered position, the roll 30 does not disturb the displacement of the mobile carriage 16.

In reverse direction, when the mobile carriage 16 moves towards the downstream end of the linear conveyor 4, the rack 37 actuates the toothed sector 36 (FIG. 5b) to cause the bracket 32 to pivot round the axis 33 and to raise the corresponding roll 30. The rack 37 releases the toothed sector 3 when the roll 30 reaches a high position, the bracket 32 then rests stably on the stop 34.

When the upper side of the endless belt 5 is in low position, it rests on the rolls 30, on complementary rolls 38 spaced regularly and, at its lateral edges on the bodywork of the conveyor.

As can be seen on FIGS. 2 and 5b, the upper side 5" of the endless belt 5 is supported by rolls 39.

FIG. 2 shows the accumulation facility with the semicircular conveyor 10 and its mobile carriage 16 positioned at the downstream end of the linear conveyor 4, whereas all the supporting rolls 30 are in raised position. In such a position, the trajectory of the products on the accumulation facility is maximal.

On FIG. 6, the semicircular conveyor 10 and its mobile carriage 16 are placed closed to the upstream end of the linear conveyor 4 and all the supporting rolls 30 are in lowered position, whereas the trajectory of the products on the accumulation facility is here minimal.

Figure 4:
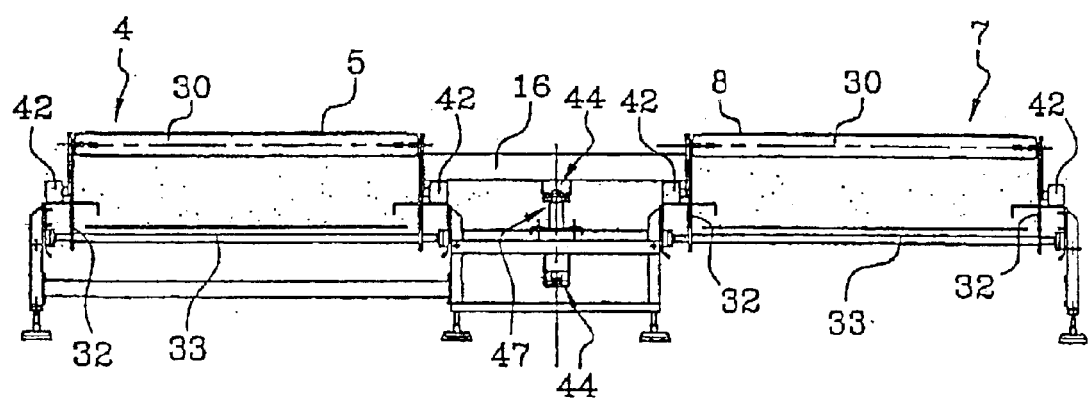
FIG. 4 is a section along 4—4 of FIG. 1.
Figure 7:
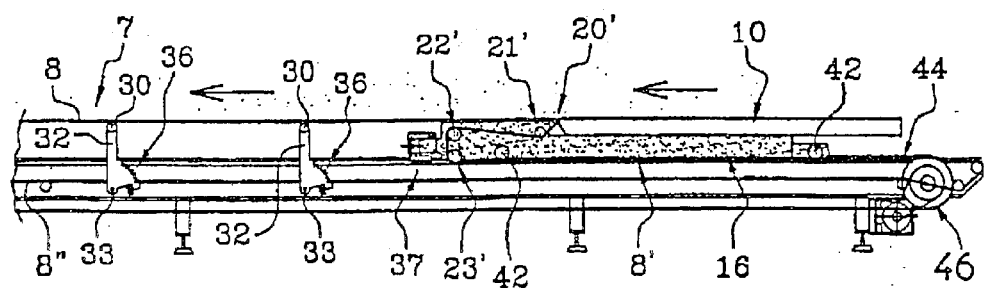
FIG. 7 is a diagrammatical sectional view along 7—7 of FIG. 1 showing the structure of the second linear conveyor.

As can be seen on FIGS. 4 and 7, the second linear conveyor 7 has a structure identical to that of the conveyor 4 described above. Thus, the upper side of the endless belt 8 of this conveyor 7 is guided by rolls 20', 21', 22' and 23' interconnected with the mobile carriage 16 (FIG. 7) in order to lower its upstream section 8' situated beneath the semicircular conveyor 10 and which does not serve as a transport plane of the products.

As explained previously, this lowering of the belt enables to place the upper side of the endless belt 11 of the semicircular conveyor 10 in the same horizontal plane as the active upper side of the endless belt 8 of the linear conveyor 7, in order to limit the disturbances of the products as they pass from conveyor to the other. Similarly, retractable rolls 30 are provided to support the upper side of the endless belt 8 forming the downstream transport plane of the products. Similarly to the first linear conveyor 4, the bracket 32 of the rolls 30 comprises a toothed sector 36 which enables to raise or lower the rolls by means of a manoeuvring rack 37 arranged on the mobile carriage 16.

In embodiment variations, the upper side of the endless belt of the second conveyor can be situated at a lower level than that of the upper side of the semicircular conveyor 10. In such a case, a complementary device is provided in the extension of the downstream end of the semicircular conveyor to receive the products and to accompany them on the underlining transport plane of the second linear conveyor. This arrangement enables to simplify the facility since the second linear conveyor may then consist of a conventional conveyor with endless belt.

FIG. 8 illustrates a variation of such type wherein the downstream end of the semicircular conveyor is fitted with a mobile sorting system 40 which enables to place the products on their edges and resting against one another.

FIG. 9 illustrates another variation of such type wherein the downstream end of the semicircular conveyor is fitted with a simple guiding sheet 41. This sheet can also be replaced with a small tilted conveyor, with endless belt.

In these various embodiments, as the products are transferred from the semicircular conveyor towards the linear conveyor with a level slope, the risks of disturbances or of degradations are limited.

In the accumulation facility according to the invention, the mobile carriage 16 which bears the semicircular conveyor 10 is mounted on wheels 42 resting on raceways provided on both parallel linear conveyors 4 and 7. This carriage 16 is maneuvered by a traction chain 44 laid out between both linear conveyors 4 and 7. The traction chain 44 winds around two pulleys 45 and 46 whereof the one (the pulley 46) is motorised, and both its ends are fixed to the carriage 16 to enable to drive said carriage into one direction or the other.

As represented on FIGS. 4, 10 and 11, the mobile carriage 16 is guided in translation on a rail 47 via lateral rollers 48 of vertical axes. The upper side of the traction chain 44 slides on this rail 47, held by lateral guides 50; these guides 50 may equip all the links of the chain 44 or only some of them.

On FIG. 11, it can be noted that the lower side of the chain 44 is housed in a hollow beam 52.

What is claimed is:

1. An accumulator device for regulating the transfer of products between an upstream unit and a downstream unit, comprising:

a first linear conveyor having fixed ends and an endless first belt adapted to receive the products from the upstream unit;

a second linear conveyor having fixed ends and an endless second belt arranged parallel to the first conveyor adapted to deliver the products towards the downstream unit;

said first and second conveyors communicating via a semicircular conveyor with an endless third belt provided above the first and second conveyors and borne by a mobile carriage driven by a translation movement parallel to said first and second conveyors;

the upstream section of the upper side of the first belt, of the upper side of the third belt, and of the downstream section of the upper side of the second belt defining a transport plane of the products having a variable length depending on the position of the semicircular conveyor;

said mobile carriage comprising first guiding means for guiding the upper side of the first belt, said first guiding means adapted to lower the downstream section of said upper side situated beneath the semicircular conveyor, which does not serve as a transport plane of the products;

said lowering enabling to place in the same plane, the transport plane of the first conveyor and the transport plane of the semicircular conveyor;

retractable supporting means for supporting the section of endless first belt forming the transport plane of said first conveyor; and said mobile carriage comprising translation maneuvering means for directly maneuvering said retractable supporting means.

2. The accumulator device according to claim 1, wherein the supporting means of the endless first belt comprise retractable rolls.

3. The accumulator device according to claim 2, wherein the rolls are each mounted on a bracket fitted with at least one toothed sector which cooperates with a rack borne by the mobile carriage, to lower or raise each roll in relation to the displacement of said carriage.

4. The accumulator device according to claim 1, wherein the translation maneuvering means comprise a traction chain whose ends are interconnected with said carriage, and which winds around two pulleys, one of which is motorized; and said mobile carriage comprising means for guiding along a longitudinal rail which also serves as a means for guiding the upper side of the traction chain via lateral guides provided on links of said chain.

5. The accumulator device according to claim 1, further comprising second guiding means for guiding the upper side of the second belt; said second guiding means adapted to lower the upstream section of said upper side situated beneath the semicircular conveyor, which does not serve as a transport plane of the products, said lowering enabling to place in the same plane, the transport plane of said semicircular conveyor and the transport plane of said second conveyor; said second guiding means being borne by the mobile carriage so that the upstream end of the transport plane of said second conveyor follows the displacement of the downstream end of said semicircular conveyor; and retractable supporting elements for supporting the section of endless second belt forming the transport plane of the second conveyor.

6. The accumulator device according to claim 5, wherein the retractable supporting elements are each mounted on a bracket fitted with at least one toothed sector, which cooperates with a rack borne by the mobile carriage to raise or lower each roll in relation to the displacement of said carriage.

7. The accumulator device according to claim 1, wherein the upper side of the second belt is arranged beneath the semicircular conveyor, and a complementary device is provided in the extension of the downstream end of said semicircular conveyor to follow the transfer of products on an underlining transport plane of said second linear conveyor.

8. The accumulator device according to claim 1, further comprising a cell positioned in the vicinity of the upstream unit for detecting the products; said cell enabling to control the speeds of at least one of the endless belts and the displacement of the mobile carriage.

* * * * *